(12) United States Patent
Uchida et al.

(10) Patent No.: US 12,271,631 B1
(45) Date of Patent: Apr. 8, 2025

(54) DATA STORAGE DEVICE SORTING ACCESS COMMANDS BASED ON PERFORMANCE AND OFF-TRACK MITIGATION OPTIMIZATION

(71) Applicant: WESTERN DIGITAL TECHNOLOGIES, INC., San Jose, CA (US)

(72) Inventors: Hiroshi Uchida, Kanagawa (JP);
Hidehiko Numasato, Kanagawa (JP);
Akira Yokozuka, Kanagawa (JP);
Shrey Khanna, San Jose, CA (US);
Kevin Tzou, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/377,666

(22) Filed: Oct. 6, 2023

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0676* (2013.01)

(58) Field of Classification Search
CPC .... G06F 3/0659; G06F 3/0604; G06F 3/0676; G06F 3/0683
See application file for complete search history.

(56) References Cited

U.S. PATENT DOCUMENTS

| 7,061,714 | B1 | 6/2006 | Yu |
| 7,471,486 | B1 * | 12/2008 | Coker ................. G11B 5/5547 711/112 |
| 7,486,471 | B2 | 2/2009 | DeRosa |
| 10,310,873 | B1 * | 6/2019 | DeRosa ................. G06F 3/067 |
| 10,839,839 | B1 | 11/2020 | Uchida et al. |
| 10,930,310 | B1 | 2/2021 | Uchida et al. |
| 11,295,781 | B1 | 4/2022 | Liu et al. |

(Continued)

FOREIGN PATENT DOCUMENTS

| CN | 1444224 A | 9/2003 |
| EP | 1189225 A2 | 3/2002 |
| JP | H08329589 | 12/1996 |

OTHER PUBLICATIONS

Gim, Jongmin et al., "Extract and Infer Quickly: Obtaining Sector Geometry of Modern Hard Disk Drive", ACM Transactions on Storage, Jul. 2010, vol. 6, Issue 2, Article No. 6, pp. 1-26; https://doi.org/10.1145/1807060.1807063.

(Continued)

*Primary Examiner* — Shawn X Gu
(74) *Attorney, Agent, or Firm* — Calderon Safran & Wright P.C.

(57) ABSTRACT

Various illustrative aspects are directed to a data storage device, method, and one or more processing devices that are configured to: select a seek time model from a plurality of seek time models based at least in part on an operational characteristic of an access command, the operational characteristic relating to an off-track susceptibility of executing the access command; determine an access time for the access command using the selected seek time model; and select a next access command for execution based on the determined access time for the access command and determined access times for other ones of a plurality of access commands.

20 Claims, 10 Drawing Sheets

(56) References Cited

U.S. PATENT DOCUMENTS

| | | |
|---|---|---|
| 2003/0174428 A1 | 9/2003 | Sakamoto |
| 2004/0125495 A1 | 7/2004 | Schmidt |
| 2005/0185318 A1 | 8/2005 | Auerbach et al. |
| 2006/0114601 A1 | 6/2006 | Semba et al. |
| 2008/0100956 A1 | 5/2008 | Kang |

OTHER PUBLICATIONS

Hwang, Kitae et al., "New Disk Scheduling Algorithms for Reduced Rotational Latency", Proceedings of the 3rd International Conference on Database Systems for Advanced Applications (DASFAA), Apr. 1993, pp. 395-402; https://doi.org/10.1142/9789814503730_0045.

\* cited by examiner

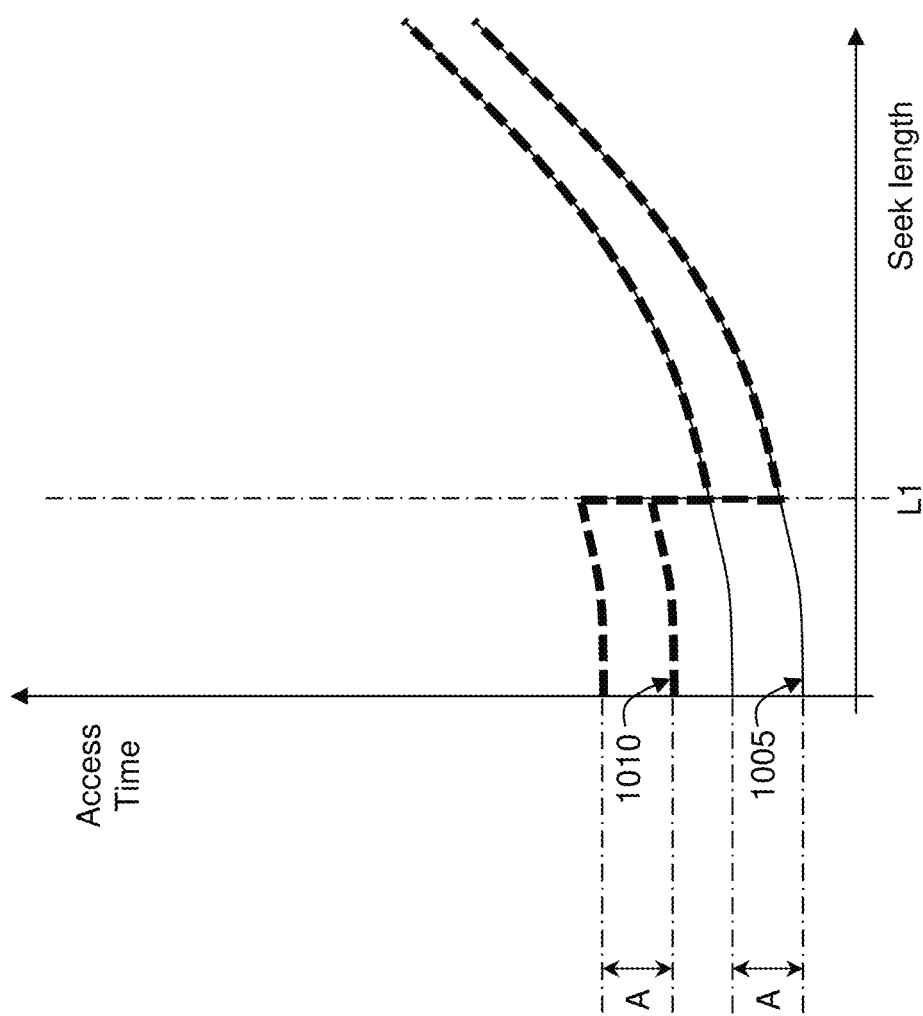

DATA STORAGE DEVICE SORTING ACCESS COMMANDS BASED ON PERFORMANCE AND OFF-TRACK MITIGATION OPTIMIZATION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as hard disk drives with control circuitry configured to perform novel and inventive next command selection with rotational positioning optimization (RPO) that does not solely focus on I/O performance. In various examples, control circuitry of this disclosure is inventively configured to select a seek time model for determining an access time for an access command based on a seek access pattern associated with the access command. In embodiments, a slow seek time model is selected for one or more commands within off-track-susceptible seek access patterns. The additional seek time that results from using the slow seek time model acts as a penalty for the risk of an off-track situation, such as an off track write (OTW) event. In this manner, the RPO system may select a best next access command based on both I/O performance and risk of an OTW event, depending on the seek access pattern. In embodiments, when the selected next command is associated with the off-track-susceptible seek access pattern, the actual seek may be delayed by the additional seek time to attenuate vibration in the seek arrival PES. In this manner, because the additional seek time has already been considered in the command scheduling, an OTW event risk may be reduced while minimizing performance loss.

Various illustrative aspects are directed to a data storage device, comprising one or more disks; an actuator mechanism configured to position one or more heads proximate to a corresponding disk surface of a corresponding disk of the one or more disks; and one or more processing devices. The one or more processing devices are configured to: select a seek time model from a plurality of seek time models based at least in part on an operational characteristic of an access command, the operational characteristic relating to an off-track susceptibility of executing the access command; determine an access time for the access command using the selected seek time model; and select a next access command for execution based on the determined access time for the access command and determined access times for other ones of a plurality of access commands.

Various illustrative aspects are directed to a method comprising: selecting, by one or more processing devices, a seek time model from a plurality of seek time models based at least in part on an operational characteristic of an access command, the operational characteristic relating to an off-track susceptibility of executing the access command; determining, by the one or more processing devices, an access time for the access command using the selected seek time model; and selecting, by the one or more processing devices, a next access command for execution based on the determined access time for the access command and determined access times for other ones of a plurality of access commands Various illustrative aspects are directed to one or more processing devices comprising means for: means for selecting a seek time model from a plurality of seek time models based at least in part on an operational characteristic of an access command, the operational characteristic relating to an off-track susceptibility of executing the access command; means for determining an access time for the access command using the selected seek time model; and means for selecting a next access command for execution based on the determined access time for the access command and determined access times for other ones of a plurality of access commands.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIG. 10 shows an example of adjusting seek time models in accordance with aspects of the present disclosure.

DETAILED DESCRIPTION

Figure 1:
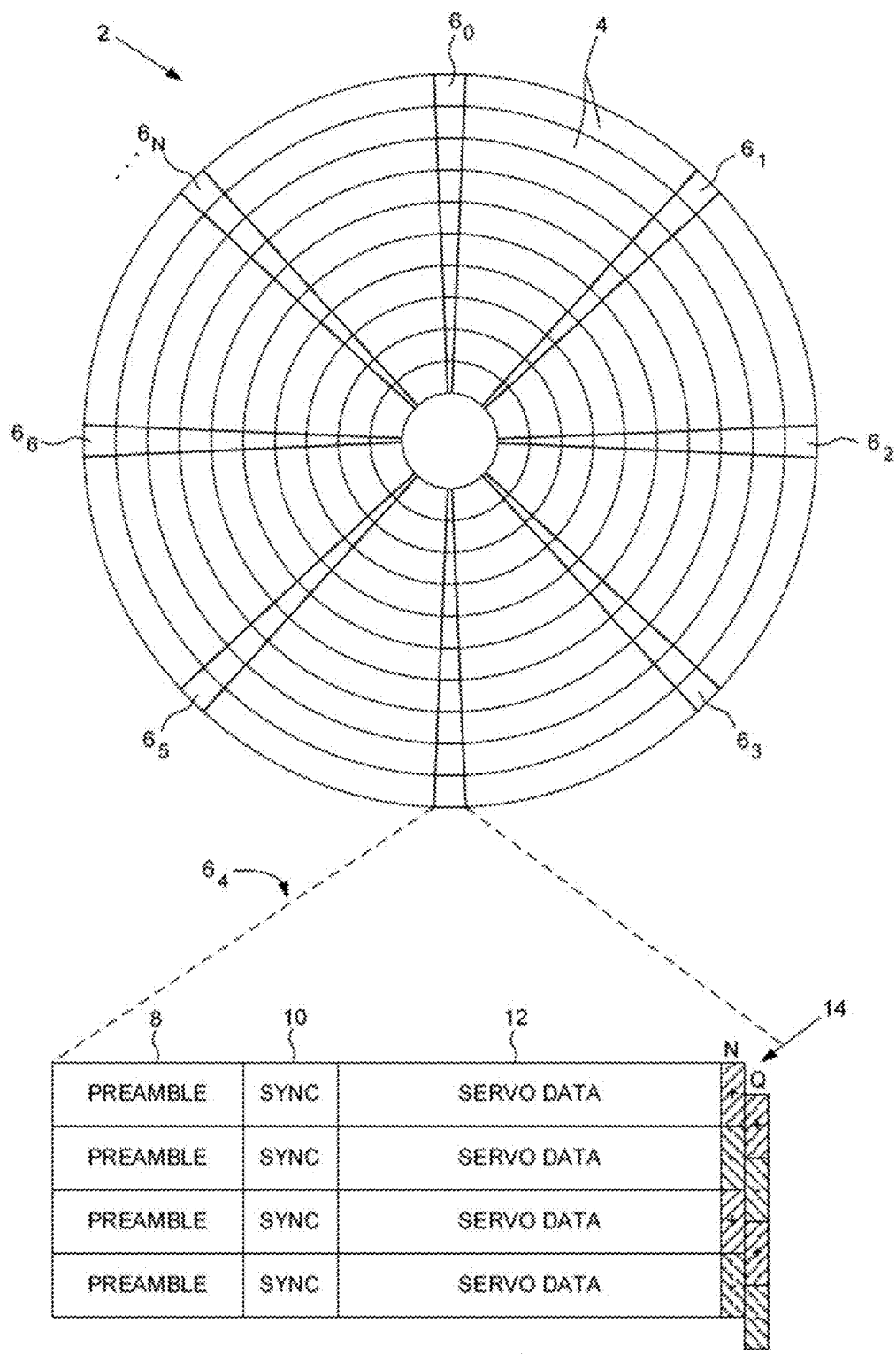
FIG. 1 shows a prior art disk format as comprising a number of radially-spaced, concentric servo tracks defined by servo wedges recorded around the circumference of each servo track.
Figure 2:
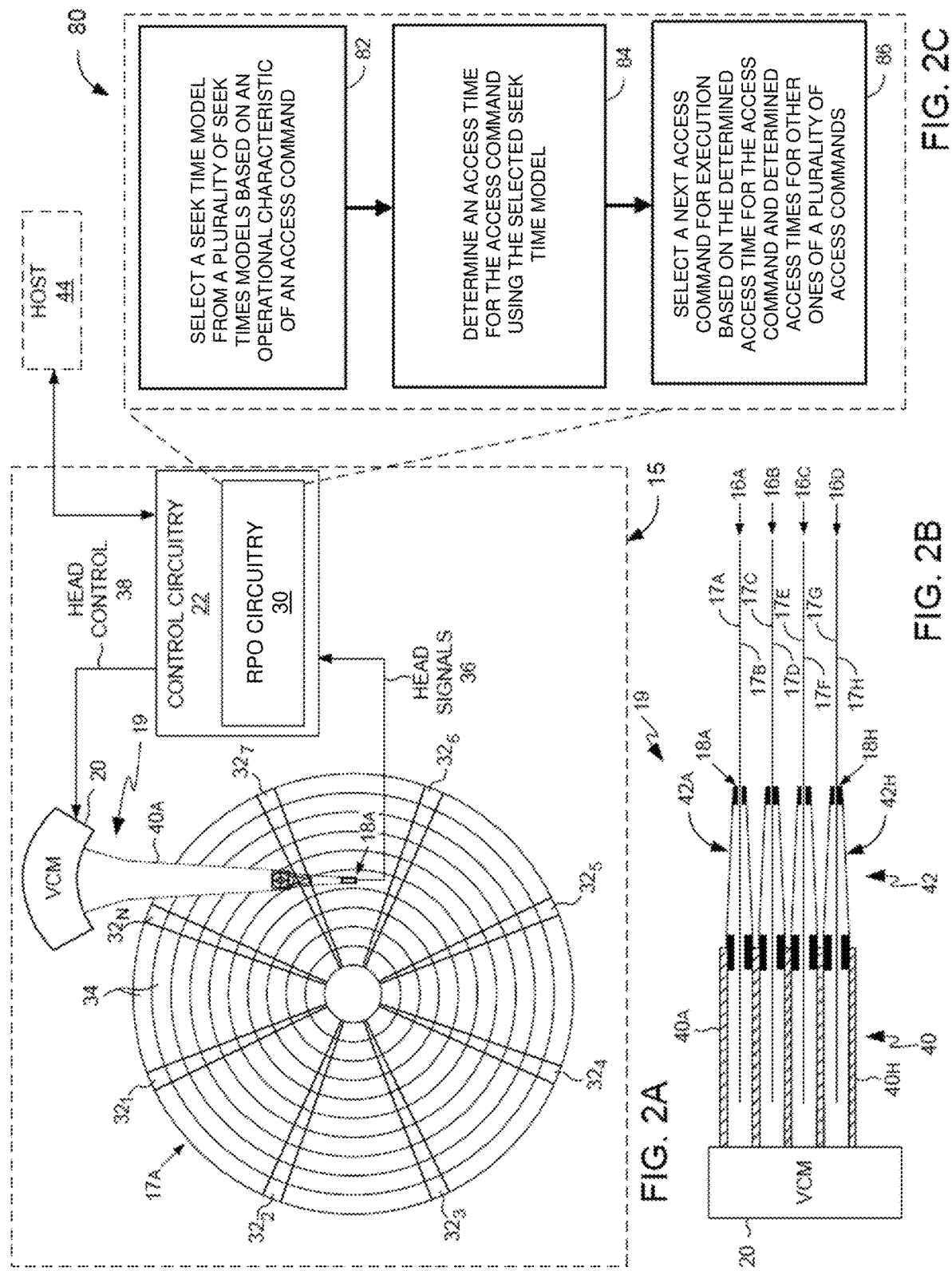
FIGS. 2A and 2B illustrate conceptual block diagrams of a top view and a side view of a data storage device in the form of a disk drive, in accordance with aspects of the present disclosure.
FIG. 2C depicts a flowchart for an example method that read/write channel circuitry of control circuitry of a disk drive may perform or execute in controlling the operations of the disk drive, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises rotational positioning optimization circuitry 30 ("RPO circuitry 30"). In one embodiment, control circuitry 22 maintains a command queue for storing access commands (e.g., read and write commands) received from host 44, and RPO circuitry 30 determines an order for executing the commands in the queue. FIG. 2C depicts a flowchart for an example method 80 that RPO circuitry 30 of control circuitry 22 may perform or execute in controlling the operations of disk drive 15, in accordance with aspects of the present disclosure, including determining an access time of an access command using a seek time model selected from a plurality of different seek time models based on an operational characteristic associated with the access command. In one embodiment, the operational characteristic comprises a seek access pattern of the access command. In another embodiment, the operational characteristic comprises a piezoelectric (PZT) actuator stroke.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, such as a PZT actuator configured to actuate a suspension relative to the actuator arm 40A and/or configured to actuate the head relative to the suspension, in some examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, RPO circuitry 30 of control circuitry 22 may select a seek time model from a plurality of seek time models based on an operational characteristic of an access command (82). RPO circuitry 30 may further determine an access time for the access command using the selected seek time model (84). RPO circuitry 30 may further select a next access command for execution based on the determined access time for the access command and determined access times for other ones of a plurality of access commands (86). Control circuitry 22, including RPO circuitry 30, may further perform additional actions, methods, and techniques, in accordance with various aspects including as further described herein.

The term "RPO circuitry 30" as used herein may refer to any hardware, firmware, software, and/or combination thereof, comprised in control circuitry 22 of disk drive 15, which implements, embodies, or engages in any of the structures or functions ascribed herein to RPO circuitry 30 or to any other of the novel and inventive aspects of the present disclosure. RPO circuitry 30 may constitute any hardware, firmware, software, and/or any other elements of control circuitry 22 for selecting a next access command for execution, and performing other techniques and methods as described herein.

Figure 3:
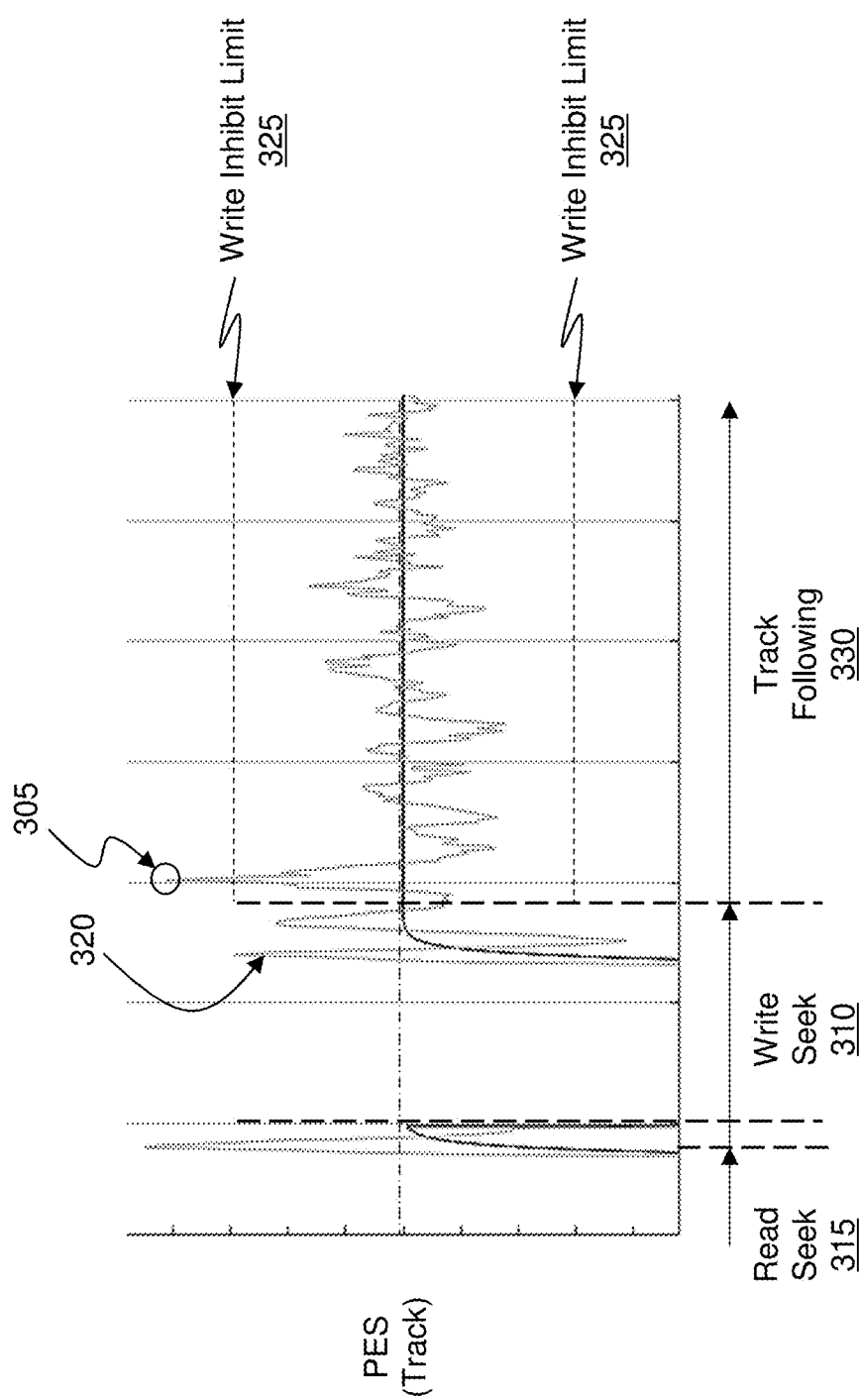
FIG. 3 shows an example of an off track write (OTW) event in accordance with aspects of the present disclosure.

FIG. 3 shows an example of an OTW event in accordance with aspects of the present disclosure. OTW event 305 may occur when a short write seek 310 is performed after completion of a long read seek 315. In this example, the read seek 315 causes a large random transient vibration (RTV) that affects the seek arrival PES 320 of the write seek 310 that follows. In this example, the RTV causes a large overrun in the seek arrival PES 320. The large overrun causes the PES 320 to be outside the write inhibit limit 325 during track following 330, which results in the OTW event 305. An OTW event, such as OTW event 305, is undesirable because it threatens data integrity, e.g., by damaging data in a neighboring track.

Approaches to reducing a large overrun in the seek arrival PES include expanding a seek qualification count for the write seek, delaying a start time of the qualification, and slowing down the write seek. However, each of these approaches significantly degrades both random I/O performance and sequential I/O performance under a vibration condition, such that these approaches are deemed not practical.

In accordance with aspects of the present disclosure, RPO circuitry 30 addresses the problem of large overrun in the seek arrival PES by selecting a next command for execution based on I/O performance and a risk of an OTW event based on a seek access pattern of an access command. In various examples, RPO circuitry 30 stores or otherwise determines a plurality of seek time models that may be used to determine respective access times for respective access commands in the command queue. In embodiments, RPO circuitry 30 selects one of the plurality of seek time models for use with a particular access command based on a seek access pattern associated with the particular access command. In one embodiment, the plurality of seek time models include an original seek time model and a slow seek time model. In this embodiment, for an access command associated with an off-track-susceptible seek access pattern (e.g., a seek access pattern that is associated with large overruns in seek arrival PES), RPO circuitry 30 determines an access time for the access command using the slow seek time model. Determining the access time using the slow seek time model may result in an access time for this access command that is greater than an access time that results from using the original seek time model. The larger access time determined using the slow seek time model imposes a penalty on the access command in the context of next command selection, which may be prioritized based at least in part on smallest-to-largest access times of the plurality of access commands in the command queue. For example, RPO circuitry 30 may select a next command having a slower seek access pattern instead of an access command having the best I/O performance. As described herein, the previous seek may affect the command selection. In this manner, RPO circuitry 30 selects the next command for execution in a way that reduces the risk of an off-track event, such as an OTW event. It is noted that for illustration purposes, the various embodiments will be described using OTW events as teaching examples, and such disclosed embodiments are not limited to OTW mitigation only and can also apply to off-track events other than OTW.

Figure 4:
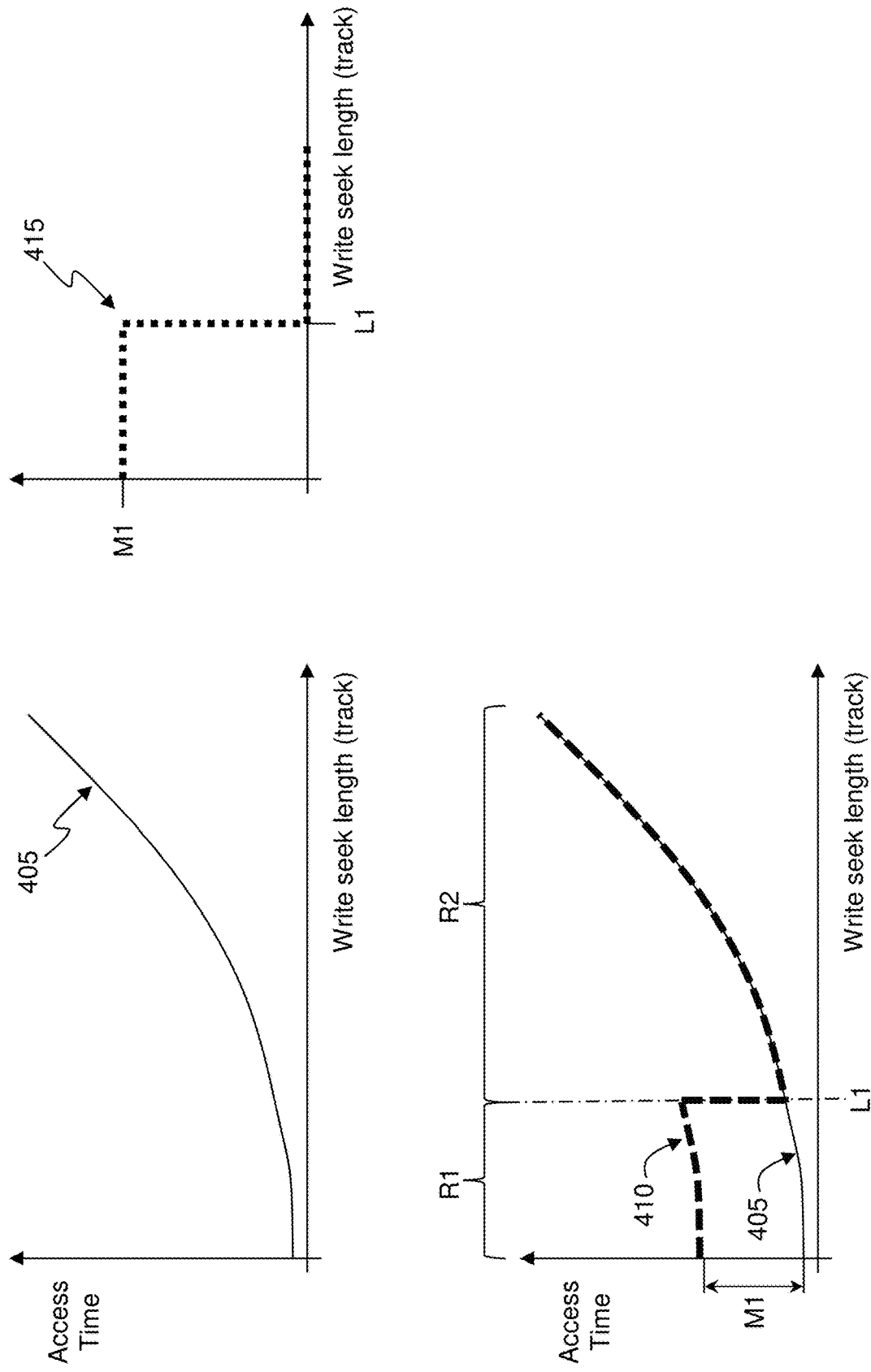
FIG. 4 shows an embodiment of an original seek time model and a slow seek time model in accordance with aspects of the present disclosure.

FIG. 4 shows an embodiment of an original seek time model 405 and a slow seek time model 410 in accordance with aspects of the present disclosure. Original seek time model 405 comprises a model that may be used to predict an access time for an access command in the command queue of disk drive 15. Original seek time model 405 may be determined empirically, for example, and may comprise a curve derived by averaging plural measurements of seek time versus seek length in one or more disk drives. In this embodiment, slow seek time model 410 comprises original seek time model 405 combined (e.g., summed) with a delay time model 415. In one example, delay time model 415 comprises a step function with a magnitude M1 and a length L1. The magnitude M1 may be defined in terms of a seek time delay count, which may be based on an empirically determined time for vibrations (e.g., RTV) to settle out of a PES in a command associated with an off-track-susceptible seek access pattern (e.g., a short write seek following a long read seek). The length L1 may be defined in terms of a seek length threshold over or under which such a command would trigger application of the delay time model. For example, in the case of a write seek following a long read seek, L1 defines what qualifies as a "short" seek that would need this delay time model to mitigate an off-track incursion risk.

In the embodiment shown in FIG. 4, an access time determined using slow seek time model 410 is greater than an access time determined using original seek time model 405 for a first region R1 of write seek length, and an access time determined using slow seek time model 410 is equal to an access time determined using original seek time model 410 for a second region R2 of write seek length. In this manner, for a "short" write seek access command having a write seek length in the first region R1, using slow seek time model 410 to determine the access time for this command results in a larger access time than using original seek time model 405. "Long" write seek access commands with longer write seek lengths in the second region R2 use the original seek time model 405.

In accordance with aspects of the present disclosure, RPO circuitry 30 uses a slow seek time model (e.g., slow seek time model 410) to determine an access time for commands that form or are otherwise a part of an off-track-susceptible seek access pattern, and RPO circuitry 30 uses an original seek time model (e.g., original seek time model 405) to determine an access time for commands that do not form or are otherwise not a part of an off-track-susceptible seek access pattern. In this manner, a command that is associated with an off-track-susceptible seek access pattern has a reduced likelihood of being selected as the next command for execution due to the increased access time provided by the slow seek time model in the first region (e.g., first region R1). In embodiments, an off-track-susceptible seek access pattern is defined in terms of a seek access pattern that has a highest likelihood of a large overrun in seek arrival PES that may result on an off-track event, such as an OTW event. In one example, such an off-track-susceptible seek access pattern comprises a short write seek following completion of a long read seek. In various examples, a long read seek may comprise a read seek that is longer than 2000 servo tracks on one of the disks 16 of the disk drive 15, and a short write seek may comprise a write seek that is less than 200 servo tracks on the one of the disks 16 of the disk drive 15. Implementations are not limited to these exemplary values, and other criteria may be used to define a long read seek and a short write seek. In other embodiments, other combinations of long/short and/or read/write seeks may be deemed off-track-susceptible.

Figure 5:
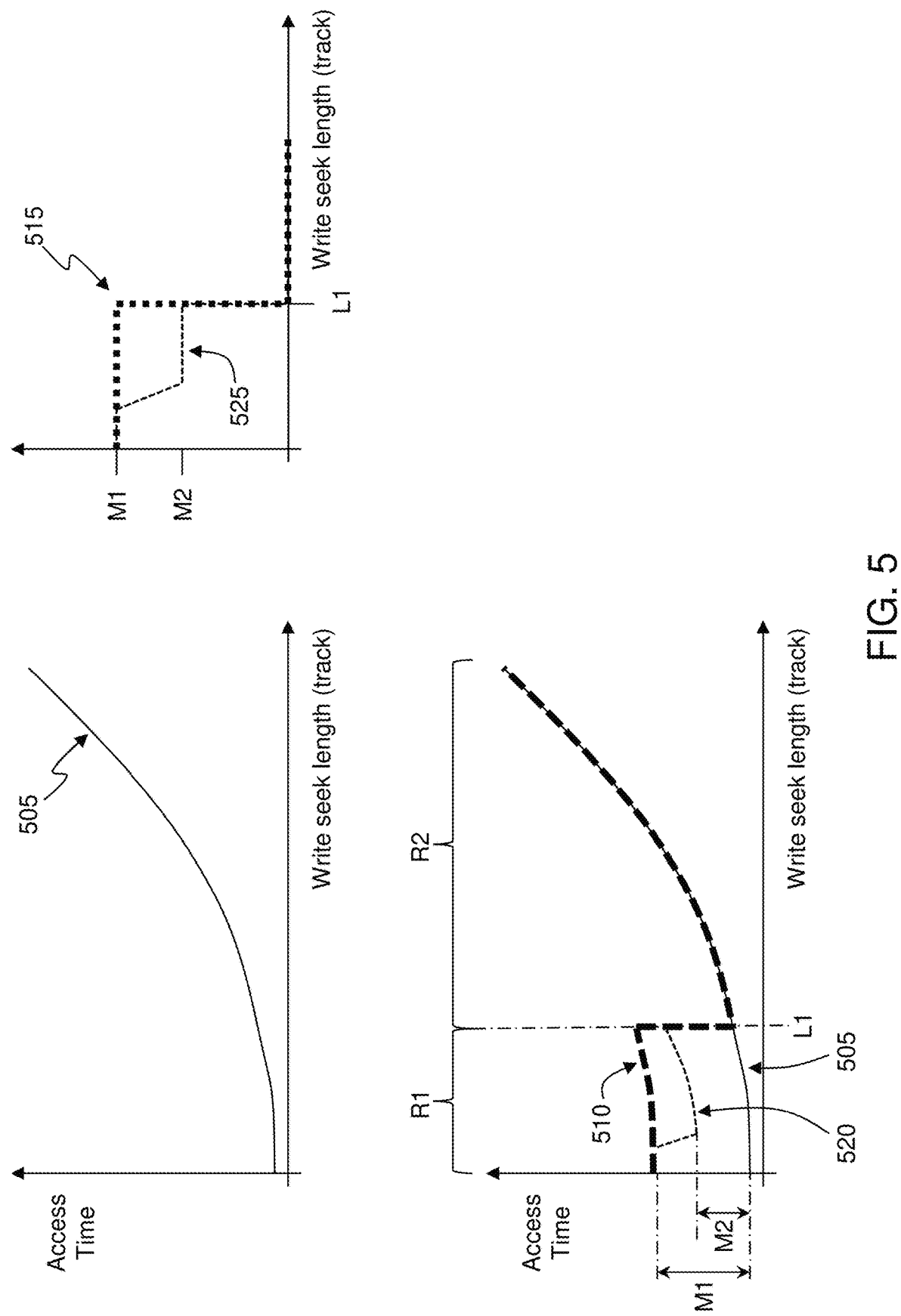
FIG. 5 shows an embodiment of an original seek time model, a first slow seek time model, and a second slow seek time model in accordance with aspects of the present disclosure.

FIG. 5 shows an embodiment of an original seek time model 505, a first slow seek time model 510, and a second slow seek time model 520 in accordance with aspects of the present disclosure. In this embodiment, first slow seek time model 510 comprises original seek time model 505 combined with a first delay time model 515, and second slow seek time model 520 comprises original seek time model 505 combined with a second delay time model 525. Original seek time model 505, first slow seek time model 510, and first delay time model 515 may correspond, respectively, to original seek time model 405, first slow seek time model 410, and first delay time model 415 of FIG. 4.

In the example shown in FIG. 5, second delay time model 525 has a different shape than first delay time model 515. For example, second delay time model 525 may have a first plateau at magnitude M1 and a second plateau at magnitude M2. As a result, second slow seek time model 520 has a different shape than first slow seek time model 510 in the first region R1.

In the embodiment of FIG. 5, for an access command that is a part of an off-track-susceptible seek access pattern, RPO circuitry 30 selects one of first slow seek time model 510 and second slow seek time model 520 for determining the access time of this command, wherein the selection is based on a status of tilt distance learning of the disk drive 15. Tilt distance is a component of seek length when a seek command is accompanied by a head switch. A short seek with a head switch may be sensitive to tilt distance. Control circuitry 22 may learn tilt distance after a power-on-reset of the disk drive 15, and control circuitry 22 may re-learn tilt distance after drive temperature exceeds a predefined threshold value. However, a value of tilt distance estimated by control circuitry 22 may not be accurate during the tilt distance learning process. In an embodiment, RPO circuitry 30 accounts for this potential inaccuracy by using a more conservative slow seek time model (e.g., first slow seek time model 510) when the tilt distance learning has a first status (e.g., tilt distance is not learned), and by using a more aggressive slow seek time model (e.g., second slow seek time model 520) when the tilt distance learning has a second status (e.g., tilt distance is learned).

Figure 6:
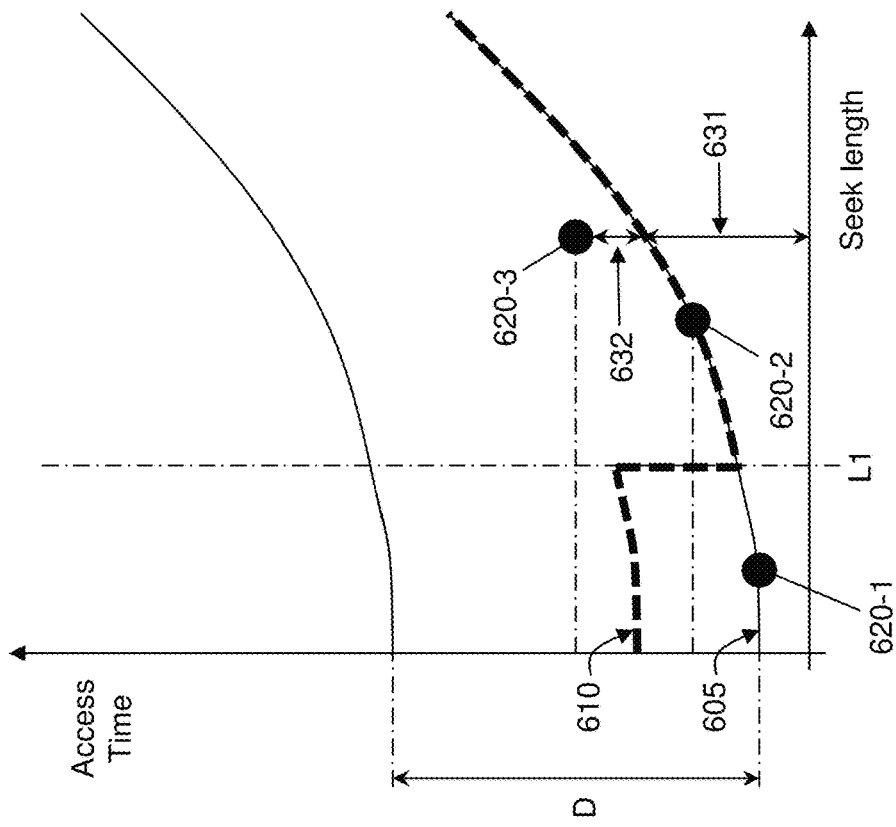
FIG. 6 shows an example of selecting seek time models for access commands and selecting a next access command for execution in accordance with aspects of the present disclosure.

FIG. 6 shows an example of selecting seek time models for access commands and selecting a next access command for execution in accordance with aspects of the present disclosure. In this example, original seek time model 605 and slow seek time model 610 may correspond, respectively, to original seek time model 405 and slow seek time model 410 of FIG. 4. First access command 620-1, second access command 620-2, and third access command 620-3 represent access commands in the command queue. In this example, first access command 620-1 is a write seek preceded by a write seek or a short read seek, which is not an off-track-susceptible seek access pattern. Because first access command 620-1 is not a part of an off-track-susceptible seek access pattern (e.g., a long read seek followed by a short write seek), RPO circuitry 30 selects original seek time model 605 for determining an access time of first access command 620-1. In this example, RPO circuitry 30 also uses the original seek time model 605 for determining an access time of second access command 620-2 and an access time of third access command 620-3. Based on the respective access times, to optimize I/O performance, RPO circuitry 30 selects first access command 620-1 as the next command for execution, e.g., since it has the lowest access time of the three access commands 620-1, 620-2, and 620-3.

With continued reference to FIG. 6, the access time of an access command may comprise a first component based on a seek time determined using a seek time model and a second component that represents a latency, e.g., waiting time, associated with the access command. For example, the access time of third access command 620-3 comprises a first component 631 based on a time determined using original seek time model 605 and a second component 632 that represents a latency. In embodiments, the latency of an access command may be defined as the difference between: (1) a radial distance from a current command to the access command, in sector ID (SID) count, and (2) a seek time of the access command, also in SID count. Still referring to FIG. 6, time D represents a time associated with one revolution of the disk associated with first access command 620-1.

Figure 7:
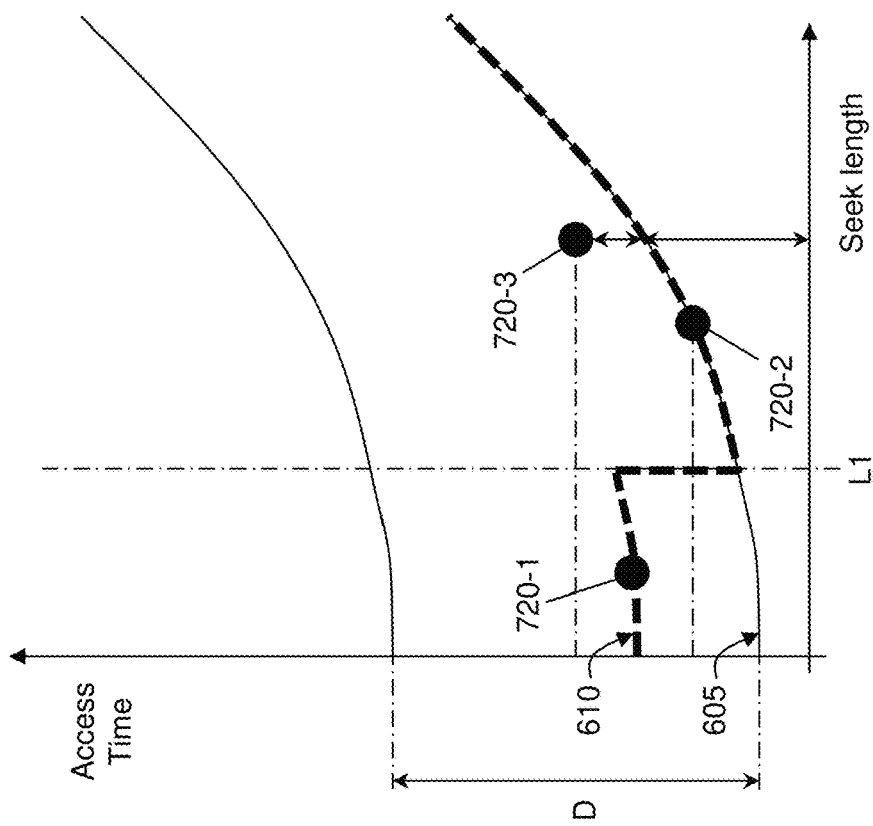
FIG. 7 shows another example of selecting seek time models for access commands and selecting a next access command for execution in accordance with aspects of the present disclosure.

FIG. 7 shows another example of selecting seek time models for access commands and selecting a next access command for execution in accordance with aspects of the present disclosure. In this example, original seek time model 605 and slow seek time model 610 may correspond, respectively, to original seek time model 405 and slow seek time model 410 of FIG. 4. First access command 720-1, second access command 720-2, and third access command 720-3 represent access commands in the command queue. In this example, first access command 720-1 is a short write seek preceded long read seek, which is an off-track-susceptible seek access pattern. Because first access command 720-1 is a part of an off-track-susceptible seek access pattern (e.g., a long read seek followed by a short write seek), RPO circuitry 30 selects slow seek time model 610 for determining an access time of first access command 720-1. In this example, RPO circuitry 30 uses original seek time model 605 for determining an access time of second access command 720-2 and an access time of third access command 720-3. Based on the respective access times, to optimize I/O performance, RPO circuitry 30 selects second access command 720-2 as the next command for execution, e.g., since it has the lowest access time of the three access commands 720-1, 720-2, and 720-3.

Figure 8:
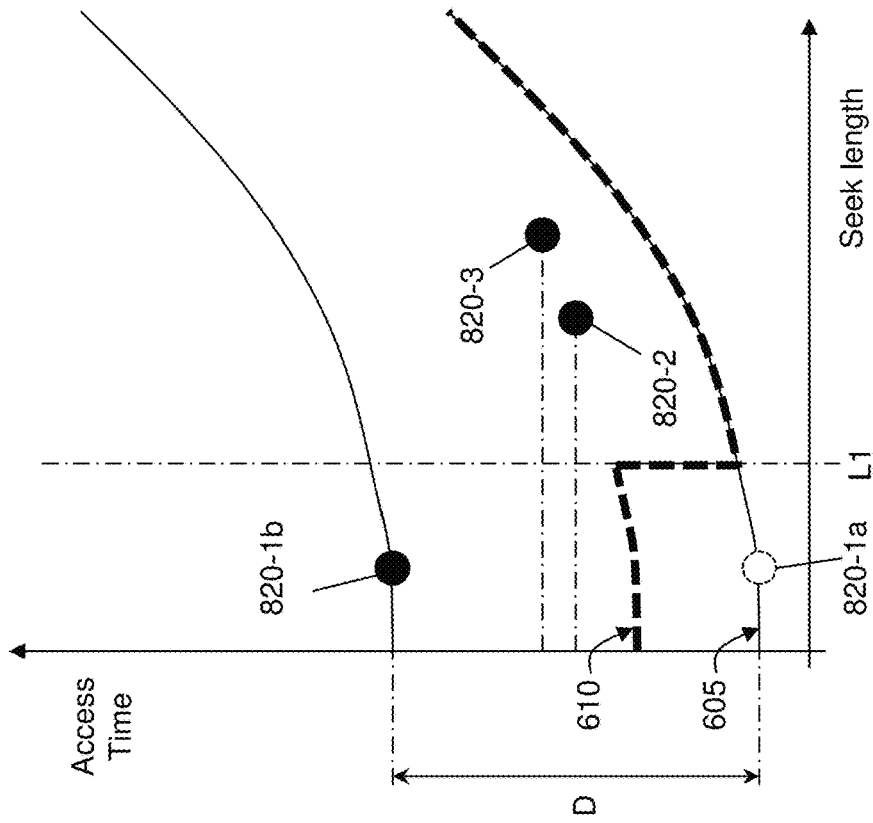
FIG. 8 shows another example of selecting seek time models for access commands and selecting a next access command for execution in accordance with aspects of the present disclosure.

FIG. 8 shows another example of selecting seek time models for access commands and selecting a next access command for execution in accordance with aspects of the present disclosure. In this example, original seek time model 605 and slow seek time model 610 may correspond, respectively, to original seek time model 405 and slow seek time model 410 of FIG. 4. First access command 820-1a, second access command 820-2, and third access command 820-3 represent access commands in the command queue. In this example, first access command 820-1a is a short write seek preceded long read seek, which is an off-track-susceptible seek access pattern. Because first access command 820-1a is a part of an off-track-susceptible seek access pattern (e.g., a long read seek followed by a short write seek), RPO circuitry 30 selects the slow seek time model 610 for determining an access time of first access command 820-1a. In this example, RPO circuitry 30 determines that a rotational distance of first command 820-1a (e.g., a rotational distance in sector count from the end data sector of the current seek command to the start data sector of the next seek command) is less than the seek time using slow seek time model 610. In this embodiment, based on this determination of rotational distance being less than the seek time using slow seek time model 610, RPO circuitry 30 determines the practical access time for first command 820-1a by summing an access time determined using the first command 820-1a and time D for one revolution of the disk, as shown by the first command 801-1b. In this example, RPO circuitry 30 uses original seek time model 605 for determining an access time of second access command 820-2 and an access time of third access command 820-3, each of which may be offset from original seek time model 605 due to a latency, e.g., in a manner similar to latency 632 of FIG. 6. Based on the respective access times, RPO circuitry 30 selects second access command 820-2 as the next command for execution, e.g., since it has the lowest access time of the three access commands 820-1b, 820-2, and 820-3.

Figure 9:
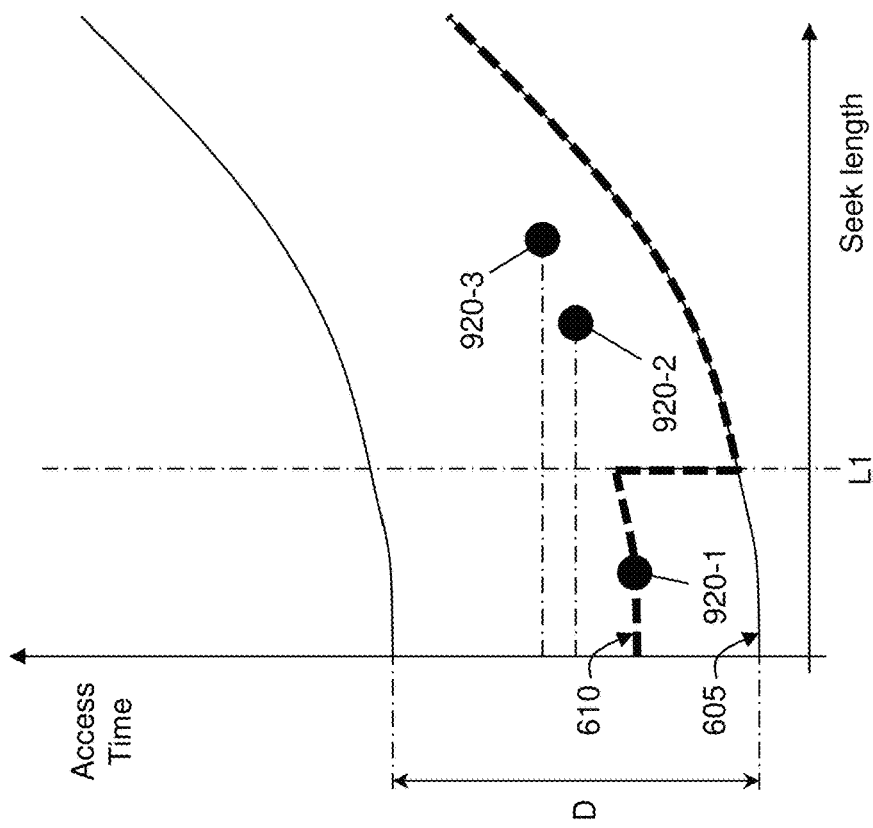
FIG. 9 shows another example of selecting seek time models for access commands and selecting a next access command for execution in accordance with aspects of the present disclosure.

FIG. 9 shows another example of selecting seek time models for access commands and selecting a next access command for execution in accordance with aspects of the present disclosure. In this example, original seek time model 605 and slow seek time model 610 may correspond, respectively, to original seek time model 405 and slow seek time model 410 of FIG. 4. First access command 920-1, second access command 920-2, and third access command 920-3 represent access commands in the command queue. In this example, first access command 920-1 is a short write seek preceded long read seek, which is the off-track-susceptible seek access pattern. Because first access command 920-1 is a part of an off-track-susceptible seek access pattern (e.g., a long read seek followed by a short write seek), RPO circuitry 30 selects slow seek time model 610 for determining an access time of first access command 920-1. In this example, RPO circuitry 30 uses original seek time model 605 for determining an access time of second access command 920-2 and an access time of third access command 920-3, each of which may be offset from original seek time model 605 due to a latency, e.g., in a manner similar to latency 632 of FIG. 6. In this example, first access command 920-1 (i.e., the command within an off-track-susceptible seek access pattern) has the lowest access time amongst the three access commands 920-1, 920-2, and 920-3, despite slow seek time model 610 being used for first access command 920-1. In embodiments, in response to an access command that is a part of an off-track-susceptible seek access pattern being the next command selected for execution, RPO circuitry 30 derates the actual seek time as scheduled (e.g., the actual seek time is derated from a seek time on original seek time model 605 to a seek time on slow seek time model 610), in order to reduce the risk of an OTW event occurring with this command. In this example, because the derated seek time has been considered by RPO circuitry 30, first access command 920-1 can be completed as scheduled by the system.

In implementations, a seek qualification delay feature may be used to derate a seek. In various examples, the seek qualification delay feature delays the start timing of seek qualification to complete a seek, and this may be used to derate the seek time accurately as planned by a delay time model such as delay time model 415 of FIG. 4.

FIG. 10 shows an example of adjusting seek time models in accordance with aspects of the present disclosure. In this example, original seek time model 1005 and slow seek time model 1010 may correspond, respectively, to original seek time model 405 and slow seek time model 410 of FIG. 4. Seek time may change based on factors such as drive temperature and drive voltage. In embodiments, RPO circuitry 30 adjusts an access time determined using original seek time model 1005 based on drive temperature or drive voltage. Such an adjustment may be made using an adjustment data structure (e.g., a table) that defines adjustment values for original seek time model 1005 based on different conditions of drive temperature and/or different conditions of drive voltage. For example, original seek time model 1005 may be based on a drive temperature of 30° C., and RPO circuitry 30 may adjust a determined access time by amount A (e.g., defined in the adjustment data structure) based on the actual drive temperature being 55° C. In this embodiment, because slow seek time model 1010 is based on original seek time model 1005, RPO circuitry 30 may use the same adjustment data structure for adjusting access times for both original seek time model 1005 and slow seek time model 1010. Although not shown, a similar adjustment may be made based on drive voltage, e.g., in response to the drive voltage being 11 volts and original seek time model 1005 being based on a drive voltage of 12 volts.

Figure 11:
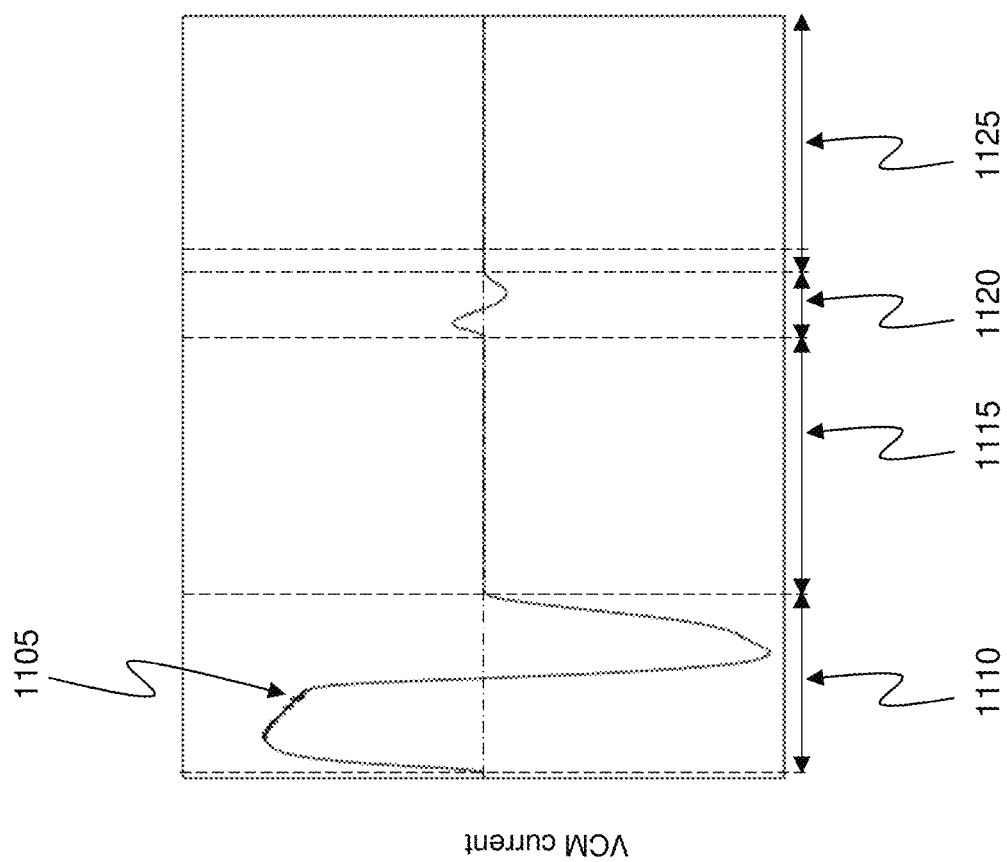
FIG. 11 shows an example of voice coil motor current relative to a long read seek, track following for reading data, a short write seek, and track following for writing data in accordance with aspects of the present disclosure.

FIG. 11 shows an example of VCM current 1105 relative to a long read seek 1110, track following 1115 for reading data, a short write seek 1120, and track following 1125 for writing data. In embodiments, in response to track following 1115 being sufficiently long, RPO circuitry 30 selects the original seek time model for short write seek 1120 despite short write seek 1120 being a part of an off-track-susceptible seek access pattern. This is because a sufficiently long track following between the long read seek and the short write seek provides ample time for attenuating vibrations (e.g., RTV). In various examples, RPO circuitry 30 may determine that a track following is sufficiently long based on the track following time exceeding a threshold value. For example, RPO circuitry 30 may determine track following 1115 comprises a "long track following" based on its track following time being greater than a threshold value, and RPO circuitry 30 may determine track following 1115 comprises a "short track following" based on its track following time being less than the threshold value. In this manner, RPO circuitry 30 may select the slow seek time model in response to the seek access pattern comprising a short write seek following a long read seek with a short track following between the short write seek and the long read seek, and RPO circuitry 30 may select the original seek time model in response to the seek access pattern comprising a short write seek following a long read seek with a long track following between the short write seek and the long read seek.

Figure 12:
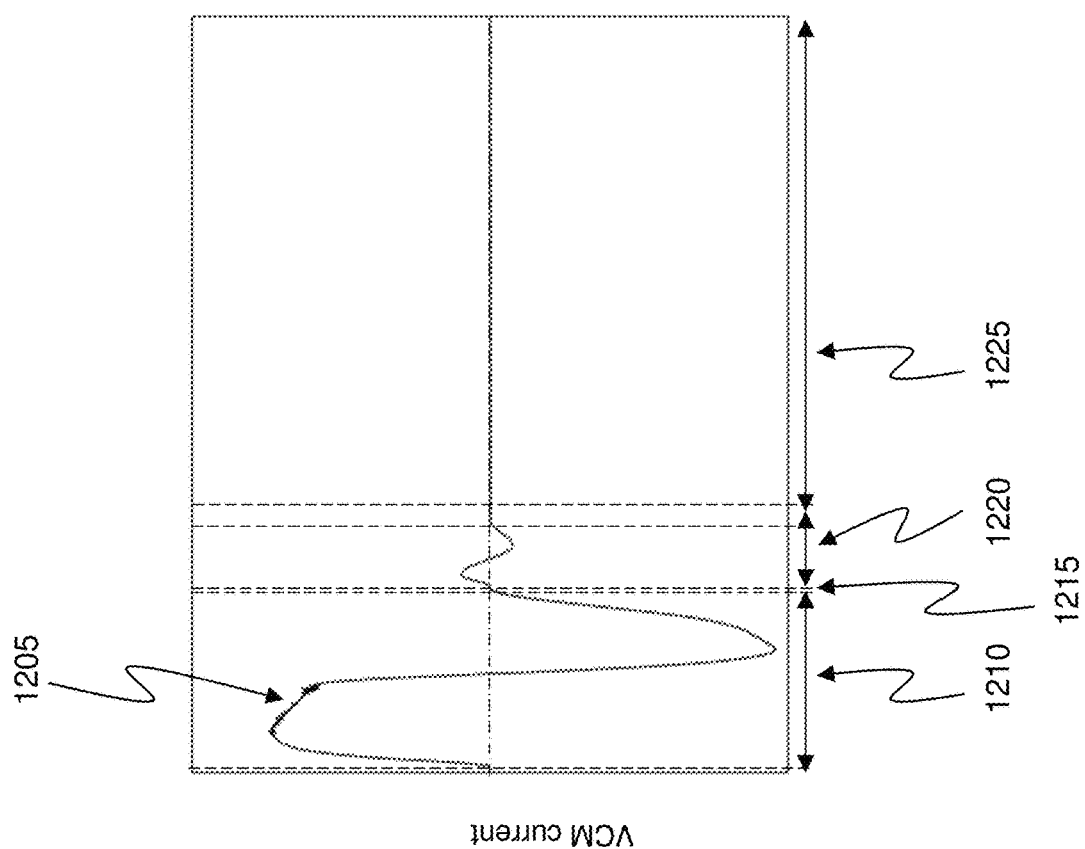
FIG. 12 shows an example of a large piezoelectric actuator stroke preceding a short write seek in accordance with aspects of the present disclosure.

FIG. 12 shows an example of a large PZT actuator stroke preceding a short write seek in accordance with aspects of the present disclosure. In this example, FIG. 12 shows VCM current 1205, read seek 1210, track following 1215 for reading data, short write seek 1220, and track following 1225 for writing data. In response to an unexpectedly large PZT actuator stroke at the write seek start (or the read seek end), the system may set a longer value to seek qualification delay count to minimize the risk of an OTW event. This may be done, for example, because the read seek might not yet have stopped. In various examples, this extra delay time may not be considered in the command scheduling, which might result in a miss-revolution. This is very rare, however, and the system may prioritize avoiding an OTW event over I/O performance because any impact on I/O performance would be small. In various examples, since the delay is intended, RPO circuitry 30 may skip the seek time adaptation process in the seek time model to avoid incorrect learning.

In another embodiment, RPO circuitry 30 may be configured to select a slow seek time model for determining an access time of an access command based on PZT actuator stroke prior to the access command exceeding a threshold value. In various examples, RPO circuitry 30 may be configured to gather seek access patterns at large PZT actuator stroke usage cases, and to optimize PZT actuator stroke usage based on these patterns. In one example, RPO circuitry 30 uses a delay time model (e.g., such as delay time model 415 of FIG. 4) as a penalty for a large PZT actuator stroke usage to avoid a large PZT actuator stroke usage event. In implementations, a command that is preceded by a large PZT actuator stroke has a reduced likelihood of being selected as the next command for execution due to the increased access time provided by the slow seek time model. In this manner, RPO circuitry 30 may optimize PZT actuator stroke usage by reducing the risk of PZT actuator stroke saturation by making large PZT actuator stroke events less likely.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position a selected head among one or more heads proximate to a corresponding disk surface of a corresponding disk among the one or more disks; and
   one or more processing devices configured to:
      select a seek time model from a plurality of seek time models based at least in part on an operational characteristic of an access command, the operational characteristic relating to an off-track susceptibility of executing the access command;
      determine an access time for the access command using the selected seek time model; and
      select a next access command for execution based on the determined access time for the access command and determined access times for other ones of a plurality of access commands.

2. The data storage device of claim 1, wherein the plurality of seek time models comprises:
   an original seek time model; and
   at least one slow seek time model based on the original seek time model and at least one delay time model.

3. The data storage device of claim 2, wherein the operational characteristic comprises the off-track susceptibility of a seek access pattern comprising the access command and an access command preceding the access command.

4. The data storage device of claim 3, wherein the selecting the seek time model comprises one of:
   selecting the at least one slow seek time model in response to the access command being a write seek with a seek length shorter than a first threshold, preceded by a read seek with a seek length longer than a second threshold; and
   selecting the original seek time model in response to the access command not being (1) a write seek with a seek length shorter than the first threshold or (2) a command preceded by a read seek with a seek length longer than the second threshold.

5. The data storage device of claim 4, wherein the selecting the at least one slow seek time model reduces a likelihood of an off track write event with the access command.

6. The data storage device of claim 3, wherein the selecting the seek time model comprises one of:
   selecting the at least one slow seek time model in response to the access command being a write seek with a seek length shorter than a first threshold, preceded by a track following with a following time shorter than a second threshold, preceded by a read seek with a seek length longer than a third threshold; and
   selecting the original seek time model in response to the access command being a write seek with a seek length shorter than the first threshold, preceded by a track following with a following time longer than the second threshold, preceded by a read seek with a seek length longer than the third threshold.

7. The data storage device of claim 2, wherein the at least one slow seek time model comprises:
   a first slow seek time model comprising the original seek time model combined with a first delay time model; and
   a second slow seek time model comprising the original seek time model combined with a second delay time model different than the first delay time model.

8. The data storage device of claim 7, wherein:
   the first delay time model is based on a first status of tilt distance learning; and
   the second delay time model is based on a second status of tilt distance learning different than the first status of tilt distance learning.

9. The data storage device of claim 2, wherein in response to determining that a rotational distance of the access command is less than a time determined using the at least one slow seek time model:
   the selecting the seek time model comprises selecting the original seek time model; and
   the determining the access time comprises adding a time of one revolution to a time determined using the original seek time model.

10. The data storage device of claim 9, wherein:
    the operational characteristic comprises a piezoelectric (PZT) actuator stroke; and
    the selecting the seek time model comprises selecting the slow seek time model in response to the PZT actuator stroke exceeding a threshold.

11. The data storage device of claim 10, wherein the selecting the at least one slow seek time model optimizes usage of the PZT actuator stroke.

12. The data storage device of claim 1, wherein the determining the access time for the access command using the selected seek time model comprises adjusting the selected seek time model based on drive temperature.

13. The data storage device of claim 1, wherein the determining the access time for the access command using the selected seek time model comprises adjusting the selected seek time model based on drive voltage.

14. The data storage device of claim 1, wherein rotational positioning optimization circuitry performs the selecting the seek time model, the determining the access time, and the selecting the next access command.

15. A method comprising:
    selecting, by one or more processing devices, a seek time model from a plurality of seek time models based at least in part on an operational characteristic of an access command, the operational characteristic relating to an off-track susceptibility of executing the access command;
    determining, by the one or more processing devices, an access time for the access command using the selected seek time model; and selecting, by the one or more processing devices, a next access command for execution based on the determined access time for the access command and determined access times for other ones of a plurality of access commands.

16. The method of claim 15, wherein:
the plurality of seek time models comprises: an original seek time model; and at least one slow seek time model based on the original seek time model and at least one delay time model; and
the operational characteristic comprises one of: the off-track susceptibility of a seek access pattern comprising the access command and an access command preceding the access command; and a piezoelectric (PZT) actuator stroke.

17. The method of claim 15, wherein the determining the access time for the access command using the selected seek time model comprises adjusting the selected seek time model based on drive temperature or drive voltage.

18. One or more processing devices comprising:
means for selecting a seek time model from a plurality of seek time models based at least in part on an operational characteristic of an access command, the operational characteristic relating to an off-track susceptibility of executing the access command;
means for determining an access time for the access command using the selected seek time model; and
means for selecting a next access command for execution based on the determined access time for the access command and determined access times for other ones of a plurality of access commands.

19. The one or more processing devices of claim 18, wherein:
the plurality of seek time models comprises: an original seek time model; and at least one slow seek time model based on the original seek time model and at least one delay time model; and
selecting the at least one slow seek time model reduces a likelihood of an off track write event with the access command.

20. The one or more processing devices of claim 18, wherein:
the plurality of seek time models comprises: an original seek time model; and at least one slow seek time model based on the original seek time model and at least one delay time model; and
selecting the at least one slow seek time model optimizes usage of a piezoelectric (PZT) actuator stroke.

* * * * *